United States Patent
Yan

(10) Patent No.: US 8,106,946 B2
(45) Date of Patent: Jan. 31, 2012

(54) CIRCUITRY TESTING METHOD AND CIRCUITRY TESTING DEVICE

(75) Inventor: Shuo-Ting Yan, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 1254 days.

(21) Appl. No.: 11/821,729

(22) Filed: Jun. 25, 2007

(65) Prior Publication Data

US 2008/0094469 A1    Apr. 24, 2008

(30) Foreign Application Priority Data

Jun. 23, 2006 (TW) .............................. 95122734 A

(51) Int. Cl.
*H04N 7/18* (2006.01)

(52) U.S. Cl. .......................... 348/126; 348/129; 702/117

(58) Field of Classification Search .................. 348/126, 348/129, 130, 147; 702/117
See application file for complete search history.

(56) References Cited

U.S. PATENT DOCUMENTS

| 3,868,508 | A | * | 2/1975 | Lloyd | 250/330 |
| 5,440,566 | A | * | 8/1995 | Spence et al. | 374/41 |
| 5,775,806 | A | * | 7/1998 | Allred | 374/124 |
| 6,294,923 | B1 | * | 9/2001 | Blish et al. | 324/750.06 |
| 6,363,166 | B1 | | 3/2002 | Wihl et al. | |
| 6,729,546 | B2 | * | 5/2004 | Roustaei | 235/462.45 |
| 7,019,300 | B2 | * | 3/2006 | Watanabe | 250/370.08 |
| 7,180,073 | B2 | * | 2/2007 | Tetsuo | 250/370.08 |
| 7,248,355 | B2 | * | 7/2007 | Larson | 356/239.1 |
| 7,401,976 | B1 | * | 7/2008 | Schlagheck et al. | 374/5 |

FOREIGN PATENT DOCUMENTS

| CN | 1392418 A | 1/2003 |
| TW | 457372 B | 10/2001 |

OTHER PUBLICATIONS

Ge-Fang Wang, Guo-Shun Chen, Ya-Feng Meng, He-Ping Li, IC Test & D lagnosis Based on IR Thermal Imaging Technique, (5th Ed), published by Laser & Nfrared in Oct. 1999. See pp. 315-317.

Xiao-Qi He, Yi Chen, Application of Infrared Heat in Hybrid Integrated Circuit Analysis, (4th Ed), published by Reliability of Electronic Product and Environmental Testing in 1997. See pp. 51-54 and 56.

Ge-Fang Wang, Ye-Shuang Tan, Li-Zhong Wang, Zhi-Jun Jia, Printed Circuit Board Infrared Fault D lagnosis Instrument, (4th Ed), published by Journal of Scientific Instrument in Aug. 2001. See pp. 231-232 and 239.

* cited by examiner

*Primary Examiner* — Patrice Winder
(74) *Attorney, Agent, or Firm* — Altis Law Group, Inc.

(57) ABSTRACT

A circuitry testing method, comprising: providing a circuit board needing testing; applying a potential (160) to the circuit board needing testing so that the circuit board works and operating elements of the circuit board needing testing emit infrared rays; testing an intensity of radiation of the infrared rays using an infrared sensor (110); converting the radiation intensity to RGB (red, green, blue) data signals in order to form a diagnostic infrared image, using a processor (130); providing a standard infrared image; comparing the diagnostic infrared image with the standard infrared image; and determining whether the circuit board is defective according to the comparison.

20 Claims, 10 Drawing Sheets

CIRCUITRY TESTING METHOD AND CIRCUITRY TESTING DEVICE

FIELD OF THE INVENTION

The present invention relates to a testing method and a testing device for finding out whether defective areas of a circuit board exist, and for finding out where any such defective areas are.

GENERAL BACKGROUND

When a circuit board operates abnormally, an automatic optical inspection (AOI) device is used to find a corresponding defect of the circuit board.

Referring to FIG. 10, this is an isometric view of a typical AOI device. The AOI device 90 includes an entrance unit 92, an inspecting unit 94, a defective product unit 96, and a non-defective product unit 98. The entrance unit 92 is connected to the inspecting unit 94, and is used to provide circuit boards that need testing to the inspecting unit 94. The inspecting unit 94 is used to test the circuit boards, and then sends defective circuit boards and non-defective circuit boards to the defective product unit 96 and the non-defective product unit 98 respectively. The defective product unit 96 and the non-defective product unit 98 are mechanically and operatively connected to the inspecting unit 94.

The inspecting unit 94 includes a slide way 941, a slide block 942, an image pick-up device (not shown), and a light source 943. The slide way 941 is a metal transmission band, and is used to transmit the circuit boards needing testing from the entrance unit 92 to a testing position in the inspecting unit 94. The slide block 942 has a carrier tray attached thereto. The slide block 942 moves along the slide way 941 and thus carries the circuit boards to various locations in the inspecting unit 94. The light source 943 illuminates the circuit boards. The image pick-up device is adjacent to the light source 943, and photographs the circuit boards to obtain images.

Referring to FIG. 11 and FIG. 12, these respectively show images of a standard circuit board without defects, and a corresponding defective circuit board. A typical method for testing the defective circuit board using the AOI device 90 includes the following steps. First, a circuit board which works normally as a standard circuit board is transmitted from the entrance unit 92 to the inspecting unit 94. Second, once the standard circuit board has arrived at a position below the light source 902 and the image pick-up device, the standard circuit board is illuminated using the light source 902. Thereby, a standard image (as shown in FIG. 11) using the image pick-up device is obtained. Third, a circuit board needing testing is provided, and the above steps are repeated to obtain a diagnostic image. Fourth, the image pick-up device compares the diagnostic image with the standard image in order to determine whether the circuit board under test is defective. Fifth, the circuit board under test is delivered to the defective product unit 96 or the non-defective product unit 98 by the slide way 941 according to the result of the determination. For example, when a region of the diagnostic image is different from the corresponding region of the standard image, the circuit board under test is regarded as a defective circuit board. Such kind of region is designated as "A" in FIG. 12. Thus the defective circuit board is transmitted to the defective product unit 96 according to the result of the determination.

However, in general, the AOI device 90 can only be used to detect metal lines of a circuit board. The AOI device 90 cannot be used to detect active components or other passive components of a circuit board. That is, the AOI device 90 cannot test all the elements of a circuit board in the testing process.

What is needed, therefore, is a circuitry testing device and a circuitry testing method that can overcome the above-described deficiencies.

SUMMARY

In an exemplary embodiment, a circuitry testing method includes the following steps: providing a circuit board needing testing; applying a potential to the circuit board needing testing so that the circuit board works and operating elements of the circuit board needing testing emit infrared rays; testing an intensity of radiation of the infrared rays using an infrared sensor; converting the radiation intensity to RGB(red, green, blue) data signals in order to form a diagnostic infrared image, using a processor; providing a standard infrared image; comparing the diagnostic infrared image with the standard infrared image; and determining whether the circuit board is defective according to the comparison. In particular, if the diagnostic infrared image is the same as the standard infrared image, the circuit board is determined to have no defect. If the diagnostic infrared image is different from the standard infrared image, the circuit board is determined to have at least one defect in at least one area thereof corresponding to at least one difference between the diagnostic infrared image and the standard infrared image.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
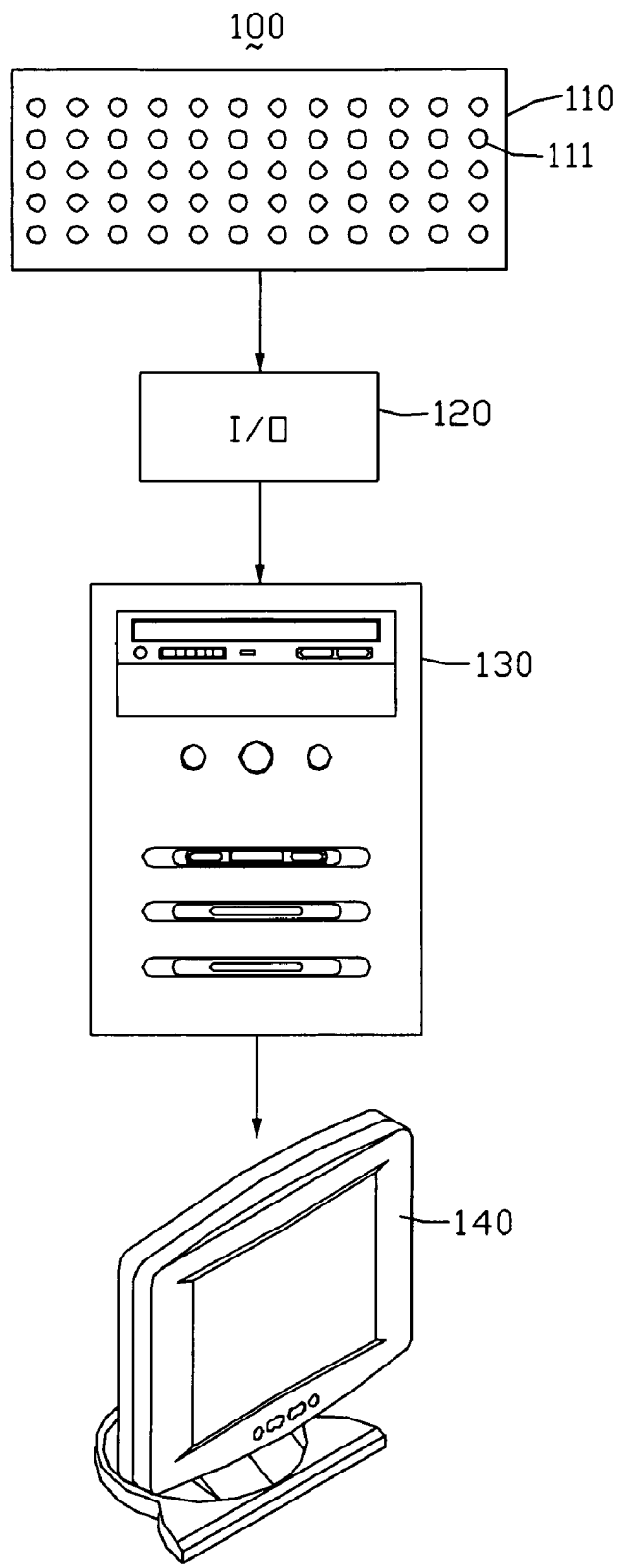
FIG. 1 is a schematic diagram of a circuitry testing device according to a first embodiment of the present invention, the circuitry testing device including an infrared sensor.

FIG. 1 is a schematic diagram of a circuitry testing device according to a first embodiment of the present invention. The circuitry testing device 100 includes an infrared sensor 110, an I/O (input/output) interface 120, a processor 130, and a display 140 electrically connected in series. The infrared sensor 110, a planar sensor, is used to test (measure) an intensity of radiation of infrared rays emitted from a circuit board having a particular operating voltage, and to convert the obtained radiation intensity values to voltage signals. The I/O interface 120 provides a communication channel between the infrared sensor 110 and the processor 130. The processor 130 converts the voltage signals to RGB (red, green, blue) data signals. The display 140 presents an infrared image according to the RGB data signals. The infrared sensor 110 includes a plurality of infrared units 111. The infrared units 111 are arranged in a matrix, and are used to test the radiation intensity of infrared rays emitted from corresponding areas of the circuit board.

Figure 2:
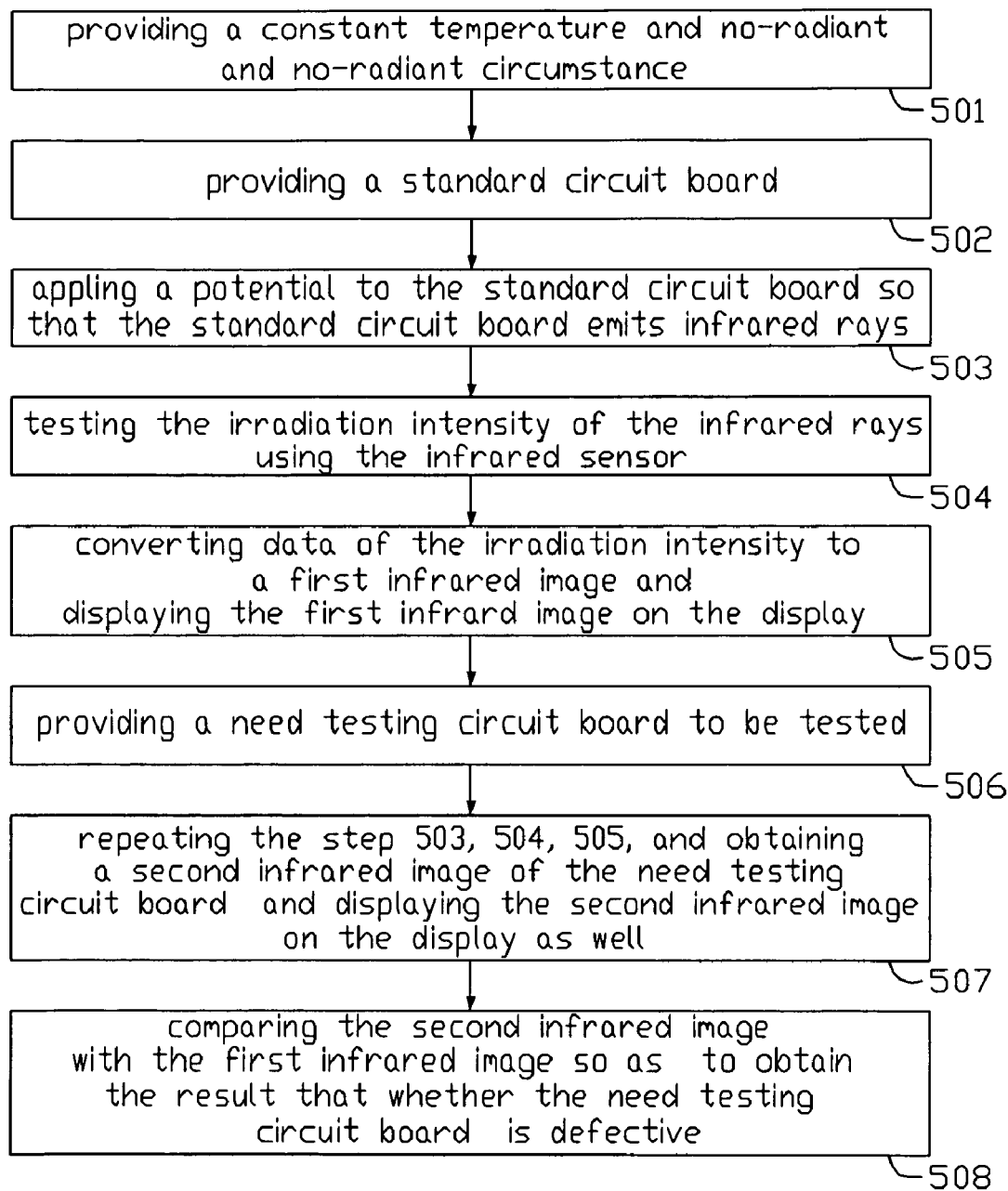
FIG. 2 is a flowchart of an exemplary circuitry testing method employing the circuitry testing device of FIG. 1.

FIG. 2 is a flowchart of an exemplary circuitry testing method using the circuitry testing device 100. The circuitry testing method includes the following steps: step 501, providing a constant temperature and radiation-free environment; step 502, providing a standard circuit board; step 503, applying a potential to the standard circuit board so that the standard circuit board emits infrared rays; step 504, testing the radiation intensity of the infrared rays using the infrared sensor 110; step 505, converting data of the radiation intensity to a first infrared image, and displaying the first infrared image on the display 140; step 506, providing a circuit board needing testing; step 507, repeating steps 503, 504 and 505, for the circuit board needing testing, thereby obtaining a second infrared image being that of the circuit board needing testing, and subsequently displaying the second infrared image on the display 140 in addition to the first infrared image; and step 508, comparing the second infrared image with the first infrared image to determine whether the circuit board needing testing is defective. In general, if the second infrared image is different from the first infrared image, a defect is considered to exist in the circuit board needing testing, the defect being in an area where the second infrared image is different from the first infrared image.

Figure 3:
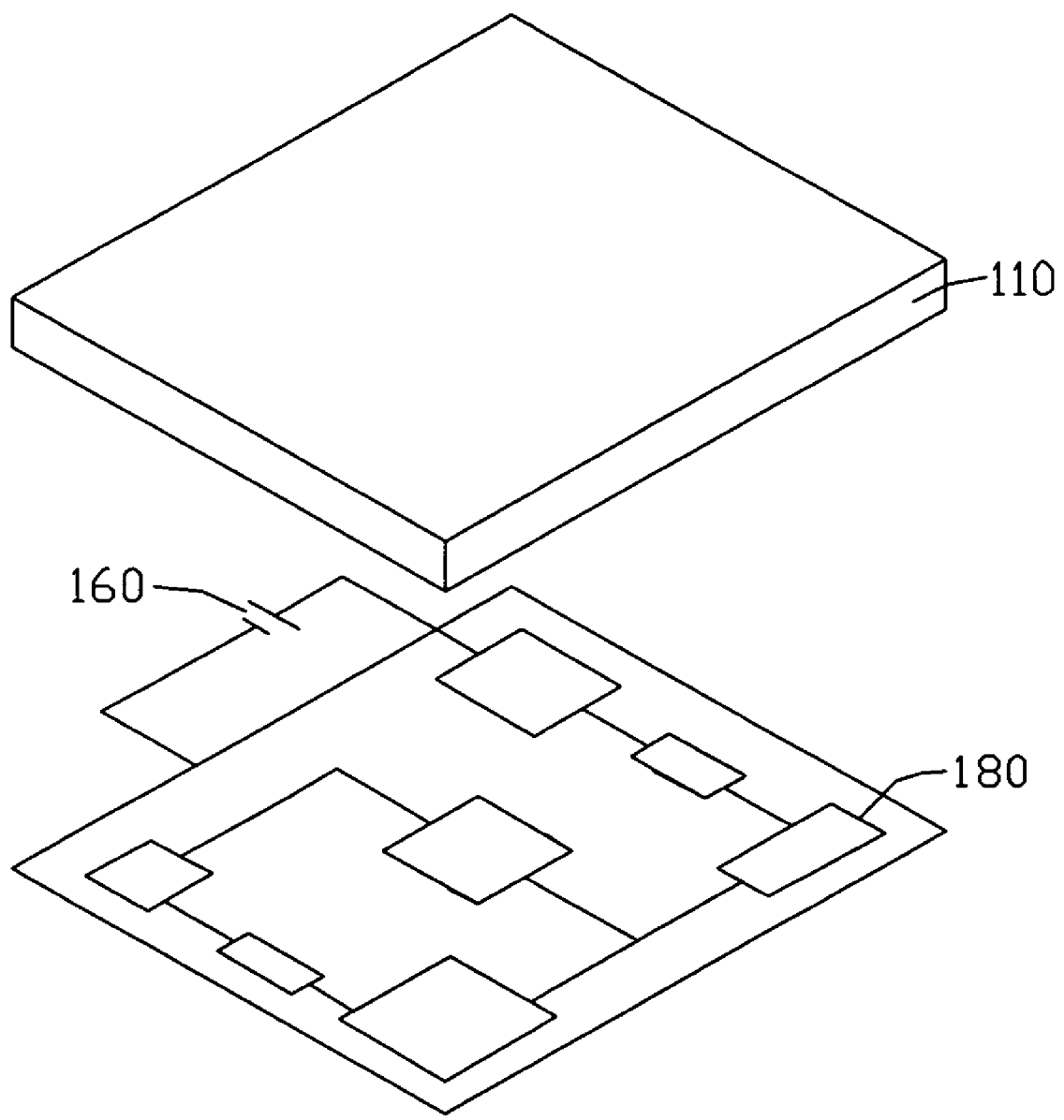
FIG. 3 is essentially an isometric view showing a step of testing a circuit board using the infrared sensor of FIG. 1, according to the method of FIG. 2.

Referring also to FIG. 3, this is essentially an isometric view showing a step of testing a standard circuit board 180 which works normally.

In steps 503 and 504, a power supply 160 is provided to apply a potential to the standard circuit board 180, so that the standard circuit board 180 emits infrared rays when it operates. The infrared sensor 110 is disposed over the standard circuit board 180 a short distance away. The infrared units 111 respectively test the radiation intensity of the infrared rays emitted from the corresponding positions of the standard circuit board 180.

Figure 4:
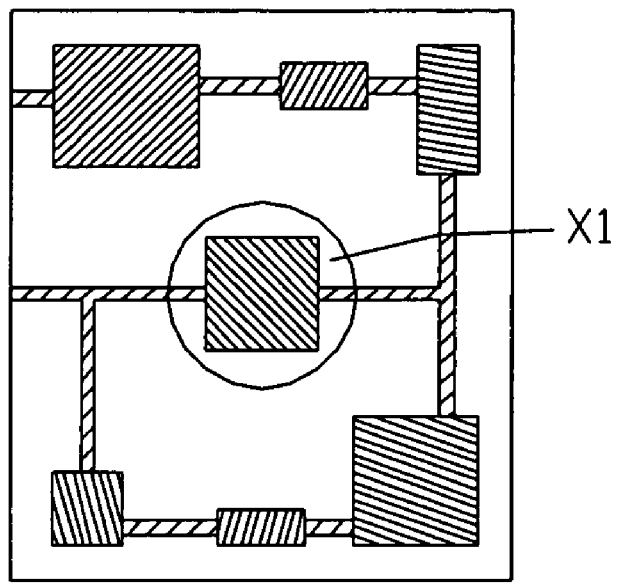
FIG. 4 is a view of an infrared image of a standard circuit board, obtained by using the circuitry testing device of FIG. 1.

Referring also to FIG. 4, this is a schematic view of a first infrared image of the standard circuit board 180. In step 505, the infrared sensor 110 converts the data of the radiation intensity to voltage signals, and transmits the voltage signals to the processor 130 through the I/O interface 120. The processor 130 stores the voltage signals until the infrared sensor 110 finishes the step of testing the standard circuit board 180. The processor 130 then converts all the voltage signals to RGB data signals, and transmits the RGB data signals to the display 140. The display 140 presents a first infrared image of the standard circuit board 180 (as shown in FIG. 4) according to the RGB data signals. The density shown in the first infrared image represents the radiation intensity of the infrared rays emitted from the standard circuit board 180.

In step 506, a circuit board needing testing is provided. The power supply 160 applies a potential to the circuit board needing testing. The circuit board needing testing has a circuit structure corresponding to that of the standard circuit board 180. Typically, the circuit board needing testing has the same circuit structure as that of the standard circuit board 180.

In step 507, the circuit board needing testing is tested by the infrared sensor 110. That is, steps 504 and 505 are repeated for the circuit board needing testing. Thereby, a second infrared image being that of the circuit board needing testing is obtained. The second infrared image is shown on the display 140 as well as the first infrared image.

Figure 5:
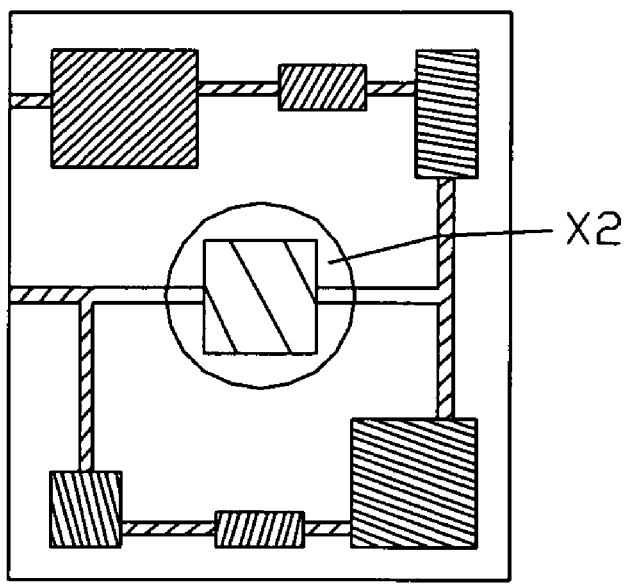
FIG. 5 is a view of an infrared image of a corresponding circuit board needing testing, obtained by using the circuitry testing device of FIG. 1.

Referring also to FIG. 5, this is a schematic view of the second infrared image of the circuit board needing testing. In step 508, the second infrared image is compared with the first infrared image by a human operator. If the second infrared image is different from the first infrared image, the circuit board is considered to be defective. In the illustrated example, the density in region "X2" of the second infrared image (FIG. 5) and the density in region "X1" of the first infrared image (FIG. 4) are different. Thus a defective area of the circuit board needing testing corresponds to the region "X2".

In addition, the processor 130 can calculate a value of the difference in the density between the second infrared image and the first infrared image. If the difference value is positive (e.g. density "X2">density "X1"), the circuit board needing testing is in a short-circuit condition. If the difference value is negative (e.g. density "X2"<density "X1"), the circuit board needing testing is in an open-circuit condition. For example, in the illustrations, the density of the region "X2" is lower than that of the region "X1". Thus there is in an open-circuit condition in the circuit board needing testing in an area corresponding to the region "X2". Typically, components or metal lines of the circuit board needing testing which are located in the area corresponding to the region "X2" are defective.

Furthermore, the radiation intensity of the infrared rays emitted from a circuit board can also be denoted by colors. That is, different colors represent different radiation intensities of the infrared rays. For example, red represents the greatest radiation intensity of the infrared rays, and blue represents the least radiation intensity of the infrared rays. If the color of a region of the second infrared image is different from that of a corresponding region of the first infrared image, the circuit board needing testing is regarded as a defective product. In the above example, the color of the region "X2" of the second infrared image (FIG. 5) is different from that of the region "X1" of the first infrared image (FIG. 4). In particular, the color of the region "X2" tends toward blue, whereas the color of the region "X1" tends towards red. Thus the difference in colors indicates that the circuit board needing testing has a defect in an area corresponding to the region "X2".

In an alternative embodiment, the processor 130 can store the voltage signals of the standard circuit board 180 as a first data array, and store the voltage signals of the circuit board needing testing as a second data array. The differences between respective values in the first data array and the second data array are calculated by the processor 130 and are converted to RGB data signals. The RGB data signals can form a colored image denoting differences in infrared radiation intensities. For example, red denotes that the radiation intensity of the infrared rays emitted from the corresponding area of the circuit board needing testing is greater than the radiation intensity of the infrared rays emitted from the corresponding area of the standard circuit board 180. Green denotes that the radiation intensity of the infrared rays emitted from the corresponding area of the circuit board needing testing is equivalent to the radiation intensity of the infrared rays emitted from the corresponding area of the standard circuit board 180. Blue denotes that the radiation intensity of infrared rays emitted from the corresponding area of the circuit board needing testing is less than the radiation intensity of the infrared rays emitted from the corresponding area of the standard circuit board 180.

In summary, the circuitry testing device 100 and the circuitry testing method can test all parts of a circuit board in one testing process, including metal lines, active components and passive components. The circuitry testing device 100 and the circuitry testing method provide comprehensive testing of the integrity of the circuit board in an efficient process.

Figure 6:
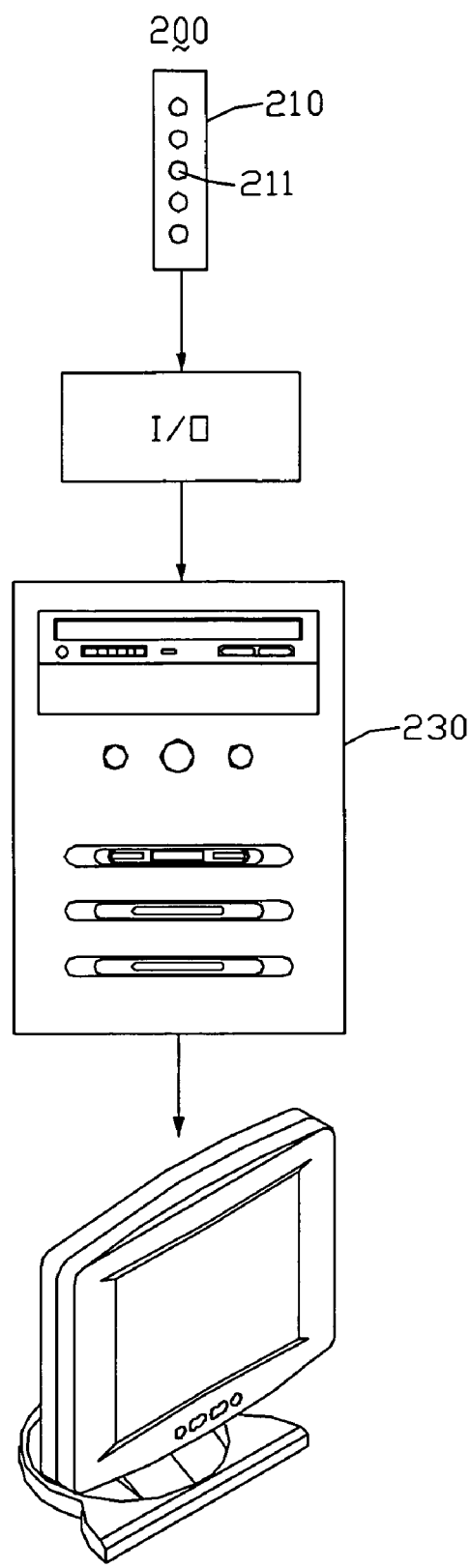
FIG. 6 is a schematic diagram of a circuitry testing device according to a second embodiment of the present invention, the circuitry testing device including an infrared sensor.
Figure 7:
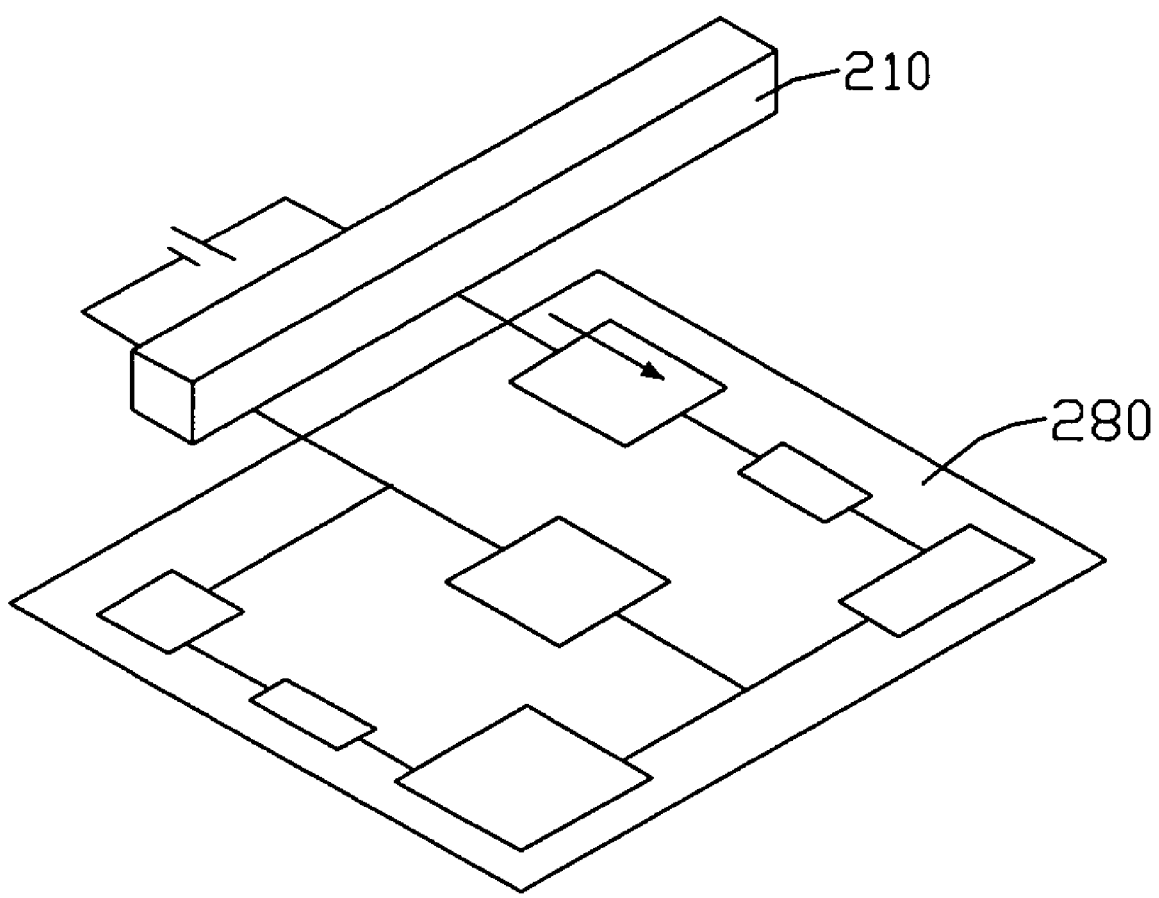
FIG. 7 is essentially an isometric view showing a step of testing a circuit board using the infrared sensor of FIG. 6.

Referring to FIG. 6, this is a schematic diagram of a circuitry testing device 200 according to a second embodiment of the present invention. The circuitry testing device 200 is similar to the circuitry testing device 100 of the first embodiment. However, the circuitry testing device 200 includes an infrared sensor 210 which is a line sensor. In particular, the infrared sensor 210 includes a plurality of infrared units 211 arranged in a line. Referring also to FIG. 7, this is a schematic view showing a step of testing a circuit board 280 using the infrared sensor 210. The infrared sensor 210 tests the radiation intensity of the infrared rays emitted from the circuit board 280 at each of successive scanning positions. That is, the infrared sensor 210 moves relative to the circuit board 280 along a linear path, so that it completes at least a single "sweep" of all the areas of the circuit board 280. The infrared sensor 210 then transmits corresponding voltage signals to the processor 230. The processor 230 stores the voltage signals until the infrared sensor 210 finishes testing the circuit board 280. In an alternative embodiment, the infrared sensor 210 is stationary, and the circuit board 280 is moved relative to the infrared sensor 210 along a linear path so that the infrared sensor 210 can test all the areas of the circuit board 280.

Figure 8:
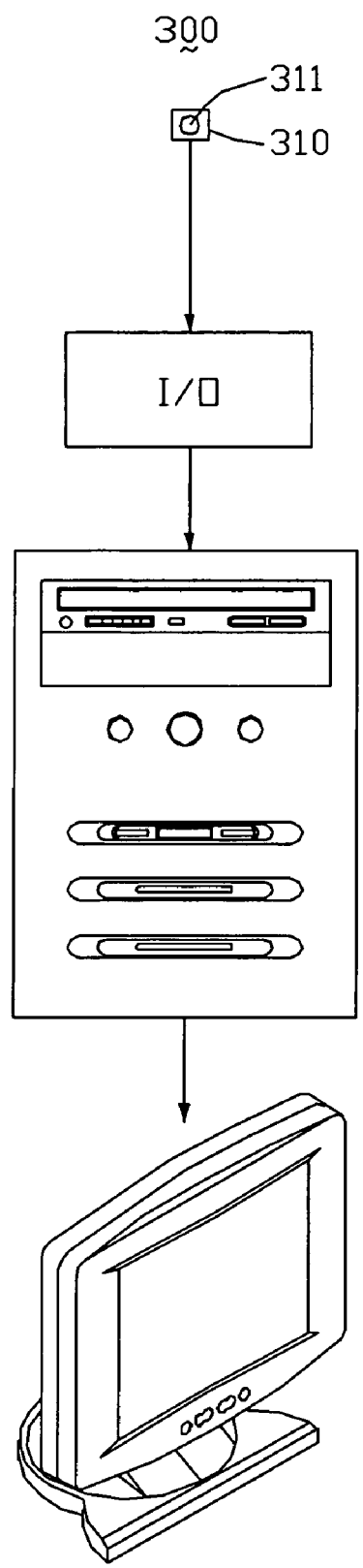
FIG. 8 is a schematic diagram of a circuitry testing device according to a third embodiment of the present invention, the circuitry testing device including an infrared sensor.
Figure 9:
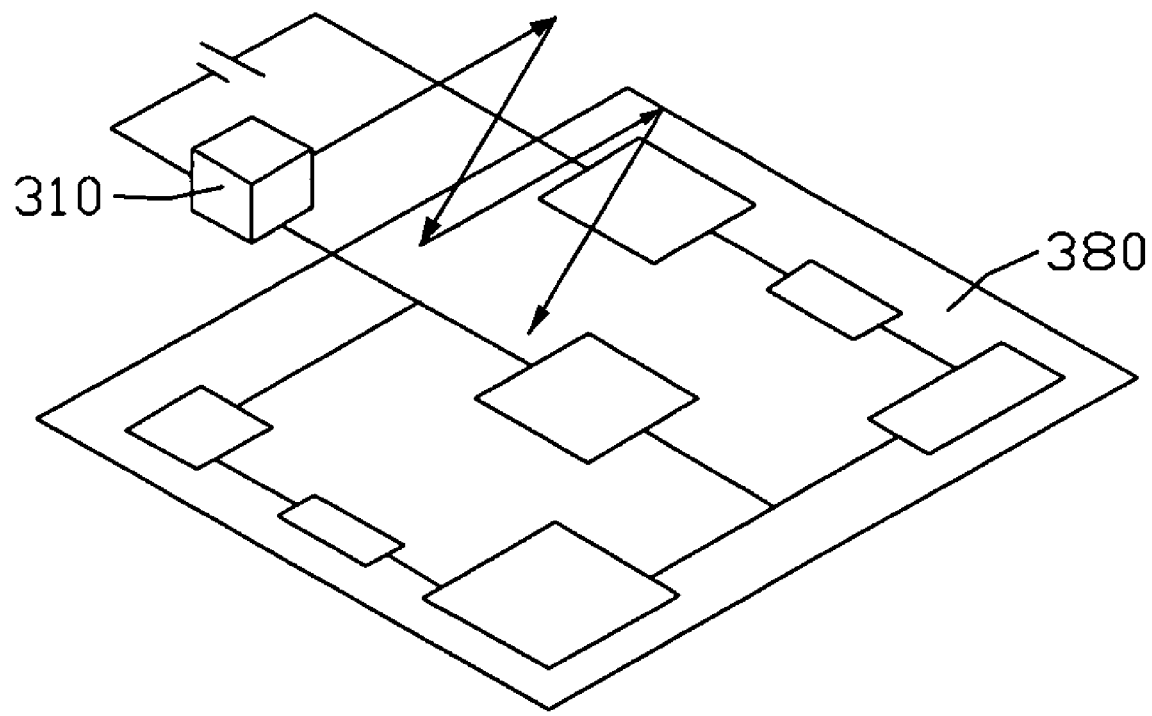
FIG. 9 is essentially an isometric view showing a step of testing a circuit board using the infrared sensor of FIG. 8.
Figure 10:
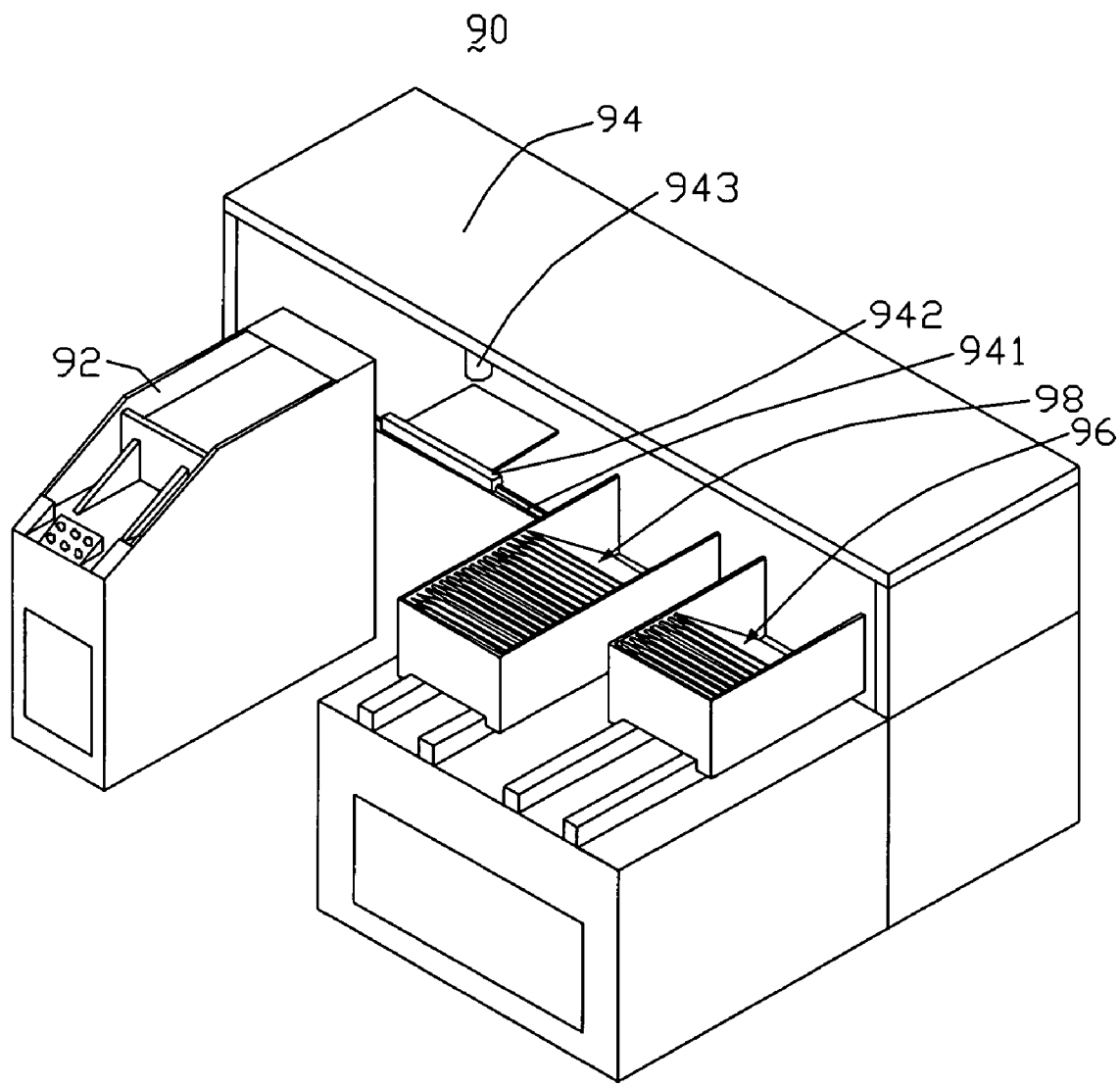
FIG. 10 is an isometric view of a conventional AOI device.
Figure 11:
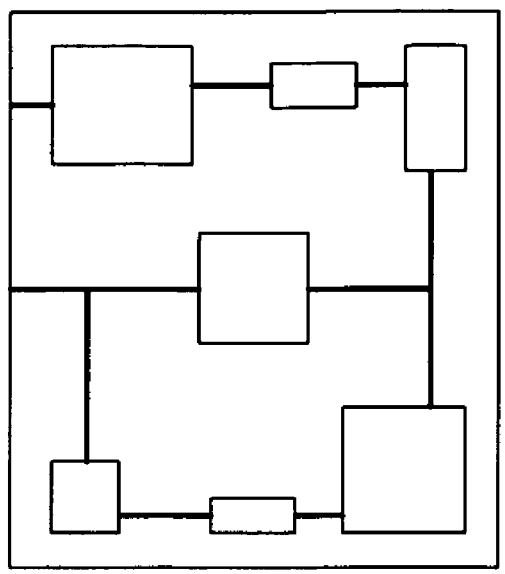
FIG. 11 is a view of a standard image of a standard circuit board, obtained by using the AOI device of FIG. 10.
Figure 12:
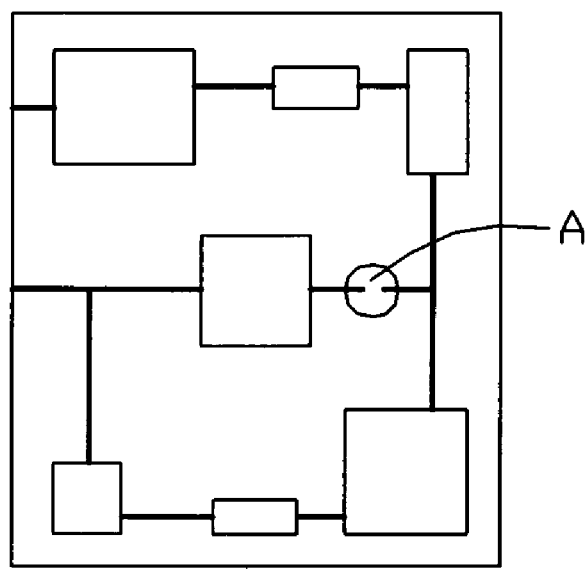
FIG. 12 is a view of an image of a corresponding defective circuit board, obtained by using the AOI device of FIG. 10.

Referring to FIG. 8, this is a schematic diagram of a circuitry testing device 300 according to a third embodiment of the present invention. The circuitry testing device 300 is similar to the circuitry testing device 100 of the first embodiment. However, the circuitry testing device 300 includes an infrared sensor 310, which is a dot type sensor. That is, the infrared sensor 310 includes a single infrared unit 311. Referring also to FIG. 9, this is a schematic view showing a step of testing a circuit board 380 using the infrared sensor 310. The infrared sensor 310 scans the circuit board 380 along a zigzagged path, so that it completes at least a single "zigzagged sweep" of all the areas of the circuit board 380. The infrared sensor 310 then transmits corresponding voltage signals to a processor 330. The processor 330 stores the voltage signals until the infrared sensor 310 finishes testing the circuit board 380. In an alternative embodiment, the infrared sensor 310 is stationary, and the circuit board 380 is moved relative to the infrared sensor 310 along a zigzagged path so that the infrared sensor 310 can test all the areas of the circuit board 380.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A circuitry testing method, comprising:
    providing a circuit board needing testing;
    applying a potential to the circuit board needing testing so that the circuit board works and operating elements of the circuit board needing testing emit infrared rays;
    testing an intensity of radiation of the infrared rays using an infrared sensor;
    converting the radiation intensity to RGB (red, green, blue) data signals in order to form a diagnostic infrared image, using a processor;
    providing a standard infrared image;
    comparing the diagnostic infrared image with the standard infrared image; and
    determining whether the circuit board is defective according to the comparison;
    wherein if the diagnostic infrared image is the same as the standard infrared image, the circuit board is determined to have no defect; and
    if the diagnostic infrared image is different from the standard infrared image, the circuit board is determined to have at least one defect in at least one area thereof corresponding to at least one difference between the diagnostic infrared image and the standard infrared image.

2. The circuitry testing method as claimed in claim 1, further comprising displaying the infrared image and the standard infrared image on a display.

3. The circuitry testing method as claimed in claim 2, wherein providing a standard infrared image comprises:
    providing a standard circuit board which works normally;
    applying a potential to the standard circuit board so that the standard circuit board works and operating elements of the standard circuit board emit infrared rays;
    testing an intensity of radiation of the infrared rays using the infrared sensor; and
    converting the radiation intensity to RGB data signals in order to form the standard infrared image, using the processor.

4. The circuitry testing method as claimed in claim 3, wherein the radiation intensity of the infrared rays is represented by the density of the infrared image.

5. The circuitry testing method as claimed in claim 4, further comprising calculating a difference between the density at each of predetermined regions of the infrared image and a corresponding region of the standard infrared image, by the processor.

6. The circuitry testing method as claimed in claim 5, wherein if the difference between the density at one of the predetermined regions of the infrared image and a corresponding region of the standard infrared image is positive, the circuit board is determined to be in a short-circuit condition; and if the difference between the density at one of the predetermined regions of the infrared image and a corresponding region of the standard infrared image is negative, the circuit board is determined to be in a open-circuit condition.

7. The circuitry testing method as claimed in claim 3, wherein the radiation intensity of the infrared rays is displayed in a plurality of colors.

8. The circuitry testing method as claimed in claim 7, wherein if the color in a region of the diagnostic infrared image is different from that of a corresponding region of the standard infrared image, the circuit board is determined to have at least one defect area corresponding to the region of the diagnostic infrared image that has the different color.

9. The circuitry testing method as claimed in claim 1, further comprising providing a constant temperature and radiation-free environment after providing the circuit board needing testing.

10. A circuitry testing method, comprising:
    providing a circuit board needing testing;
    applying a potential to the circuit board needing testing so that the circuit board works and operating elements of the circuit board needing testing emit infrared rays;

testing an intensity of radiation of the infrared rays, and converting the radiation intensity to voltage signals using an infrared sensor;

storing the voltage signals as a first data array, using a processor;

providing voltage signals converted by an intensity of radiation of the infrared rays emitted from a standard circuit board corresponding to the circuit board, and defining the voltage signals as a second data array;

calculating any differences and any equivalences between respective values in the first data array and the second data array, using the processor;

converting any differences and any equivalences found to RGB (red, green, blue) data signals using the processor in order to form a colored image;

displaying the colored image using a display; and determining whether the circuit board is defective according to one or more colors of the colored image displayed.

11. The circuitry testing method as claimed in claim 10, wherein a first color is displayed on the display when one of the voltage signals of the circuit board is greater than the corresponding voltage signal of the standard circuit board.

12. The circuitry testing method as claimed in claim 10, wherein a second color is displayed on the display when one the voltage signals of the circuit board is equivalent to the corresponding voltage signal of the standard circuit board.

13. The circuitry testing method as claimed in claim 10, wherein a third color is displayed on the display when one of the voltage signals of the circuit board is less than the corresponding voltage signal of the standard circuit board.

14. The circuitry testing method as claimed in claim 10, further comprising providing a constant temperature and radiation-free environment after providing the circuit board needing testing.

15. A circuitry testing device, comprising:

an infrared sensor configured to test radiation intensity of infrared rays emitted from a circuit board needing testing having a particular operating voltage, and convert the radiation intensity to voltage signals;

a processor electrically connected to the infrared sensor, the processor configured to store voltage signals obtained by conversion from an intensity of radiation of infrared rays emitted from a standard circuit board corresponding to the circuit board, and configured to process the voltage signals of the circuit board and the voltage signals of the standard circuit board in order to obtained at least one group of RGB (red, green, blue) data signals; and a display used to show corresponding images formed by the at least one group of RGB data signals in order to determine whether the circuit board is defective.

16. The circuitry testing device as claimed in claim 15, wherein the infrared sensor comprises at least one infrared unit used to test the radiation intensity of infrared rays emitted from corresponding areas of the circuit board.

17. The circuitry testing device as claimed in claim 16, wherein the at least one infrared unit has a selected one of the following forms: a plurality of infrared units arranged in a matrix, a plurality of infrared units arranged in a line, and a single infrared unit.

18. The circuitry testing device as claimed in claim 15, wherein the processor respectively converts the voltage signals of the circuit board to a first group of RGB data signals and the voltage signals of the standard circuit board to a second group of RGB data signals, and the display shows two corresponding images according to the two groups of RGB data signals.

19. The circuitry testing device as claimed in claim 15, wherein the processor calculates differences between respective values in the voltage signals of the circuit board and the voltage signals of the standard circuit board and converts the differences to RGB data signals, and the display shows a corresponding image formed by the RGB data signals.

20. The circuitry testing device as claimed in claim 15, further comprising an I/O (input/output) interface providing a communicate channel between the infrared sensor and the processor.

* * * * *